US007259795B2

United States Patent
Lee

(10) Patent No.: US 7,259,795 B2
(45) Date of Patent: Aug. 21, 2007

(54) METHOD FOR SELECTING AN AUDIO LANGUAGE OF A SET-TOP BOX AND MEDIUM INCLUDING COMPUTER READABLE CODE CONTROLLING A COMPUTER TO PERFORM THE SAME

(75) Inventor: Jong-chool Lee, Gunpo (KR)

(73) Assignee: Samsung Electronics CP., Ltd., Suwon-Si (KR)

( * ) Notice: Subject to any disclaimer, the term of this patent is extended or adjusted under 35 U.S.C. 154(b) by 856 days.

(21) Appl. No.: 10/700,055

(22) Filed: Nov. 4, 2003

(65) Prior Publication Data

US 2004/0143429 A1    Jul. 22, 2004

(30) Foreign Application Priority Data

Nov. 4, 2002    (KR) ............... 10-2002-0067822

(51) Int. Cl.
    H04N 7/00    (2006.01)
    H04N 11/00   (2006.01)
    H04N 5/445   (2006.01)
    H04N 5/50    (2006.01)
    H04N 5/44    (2006.01)
    H04N 5/60    (2006.01)
    H04N 5/455   (2006.01)
    H04N 5/91    (2006.01)

(52) U.S. Cl. ............ 348/569; 348/462; 348/465; 348/468; 348/563; 348/564; 348/725; 348/738; 386/99

(58) Field of Classification Search ........ 348/563, 348/564, 569, 462, 465, 468, 738, 725; 725/137; 386/39, 98, 96, 99, 104, 105, 106
See application file for complete search history.

(56) References Cited

U.S. PATENT DOCUMENTS

| 6,320,621 | B1 * | 11/2001 | Fu ............... 348/465 |
| 6,661,466 | B1 * | 12/2003 | Kou ............. 348/553 |
| 6,879,349 | B2 * | 4/2005 | Nishida et al. ... 348/553 |
| 6,940,563 | B2 * | 9/2005 | Ishihara ......... 348/738 |
| 7,051,360 | B1 * | 5/2006 | Ellis et al. ...... 725/136 |
| 7,057,669 | B2 * | 6/2006 | Lee .............. 348/563 |
| 7,068,321 | B2 * | 6/2006 | Yamamoto et al. .. 348/485 |
| 2001/0002852 | A1 * | 6/2001 | Kwoh ........... 348/465 |
| 2002/0044222 | A1 | 4/2002 | Lee |
| 2002/0186328 | A1 | 12/2002 | Nishida et al. |

FOREIGN PATENT DOCUMENTS

EP    833 514 A2    4/1998

* cited by examiner

Primary Examiner—Brian P. Yenke
(74) Attorney, Agent, or Firm—Staas & Halsey LLP

(57) ABSTRACT

A method for selecting an audio language of a digital broadcasting receiver, including determining whether an audio language selection has been made, increasing an audio language on-screen display order number by one, setting a previous audio language on-screen display order number to equal the value of the increased audio language on-screen display order number, displaying a current audio language index, fetching a new current audio language index and setting the current audio language on-screen display order number to correspond to the new current audio language index, comparing the previous audio language on-screen display order number with the current audio language on-screen display order number, and displaying the new current audio language index when the previous audio language on-screen display order number and current audio language on-screen display order number are different.

12 Claims, 3 Drawing Sheets

METHOD FOR SELECTING AN AUDIO LANGUAGE OF A SET-TOP BOX AND MEDIUM INCLUDING COMPUTER READABLE CODE CONTROLLING A COMPUTER TO PERFORM THE SAME

CROSS-REFERENCE TO RELATED APPLICATIONS

This application claims the benefit of Korean Patent Application No. 2002-67822, filed on Nov. 4, 2002, the disclosure of which is incorporated herein in its entirety by reference.

BACKGROUND OF THE INVENTION

1. Field of the Invention

The present invention relates to audio language selection in a digital broadcasting receiver, and more particularly, the present invention related to a method, and medium including computer readable code, for selecting an audio language, for a digital broadcasting receiver, while preventing the generation of errors during the selection of an audio language available to the digital broadcasting receiver.

2. Background of the Related Art

Generally, separate audio data types may be embedded with one video data in a data stream in a digital broadcast. Users of a digital broadcasting receiver may select one audio data type, corresponding to a desired audio language, out of a plurality of audio data types, i.e., out of a plurality of audio languages. Here, separate audio data types, representing separate available audio languages, respectively, may represent multiple national languages, for a multi-sound broadcasting.

When the separate audio languages are embedded in a data stream, a user can select one of the audio languages as a default, in a displayed menu. The digital broadcasting receiver then outputs the selected audio language, if the selected audio language is embedded in the data stream. However, if the selected audio language is not present in the data stream, the receiver will output an audio language first in order of the audio languages embedded in the data stream. The receiver will further display an audio language index so the user may then select one language in the index to determine the audio language audio data type, embedded in the data stream, to be accessed for output by the receiver.

Typically, the index of the available audio languages embedded in the data stream is displayed to a user to permit the user to select one of the audio languages for output by the receiver as the selected audio language. First, the user will initiate the display of an audio language selection menu, initialized with information of the available audio languages embedded in a current data stream, to display the index of available audio languages. The user then selects a desired audio language from the displayed available audio languages for use by the receiver when outputting audio.

However, if an order in the data stream of any of the available audio languages or the availability of any of audio languages is changed, e.g., by an end of transmission after the audio selection menu has been initialized, the audio language previously selected and actual audio language information in the data stream may not match, thereby causing an error. In this case, the user cannot select the desired audio language for output by the receiver.

SUMMARY OF THE INVENTION

An aspect and/or advantage of the present invention is to provide solutions to at least the above problems and/or disadvantages.

Accordingly, an aspect and/or advantage of the present invention is to provide a method for selecting an output audio language for a digital broadcasting receiver, such that the digital broadcasting receiver is capable of adaptively selecting the output audio language even when available audio language information changes in a received data stream, by updating the available audio language information upon a selection of the audio language.

Additional aspects and/or advantages of the invention will be set forth in part in the description which follows and, in part, will be obvious from the description, or may be learned by practice of the invention.

In order to accomplish the above aspects and/or other features of the present invention, there is provided a method for selecting an audio language of a digital broadcasting receiver by detecting and updating a PMT including audio track information, from an input digital broadcasting stream, the method including determining whether an audio language, of available audio languages of a data stream, has been selected for reproduction by the digital broadcasting receiver, increasing current audio language on-screen display order number, in a current on-screen audio language index, by one, when the audio language has been selected, setting a previous audio language on-screen display order number to equal a value of the increased audio language on-screen display order number and storing the increased audio language on-screen display order number in the current audio language index, displaying the current audio language index having the increased current audio language on-screen display order number, fetching a new current audio language index, to set the current audio language on-screen display order number to correspond to the new current audio language index, comparing the previous audio language on-screen display order number with the current audio language on-screen display order number, displaying the new current audio language index, setting the previous audio language on-screen display order number to equal the value of the current audio language on-screen display order number, and then returning to the operation of determining of whether a audio language selection has been made when the previous audio language on-screen display order number and current audio language on-screen display order number are different, and returning to the operation of determining of whether a audio language selection has been made when the previous audio language on-screen display order number and current audio language on-screen display order number are the same.

In the method for selecting an audio language the current audio language index may be set to correspond to the new current audio language index when the PMT is determined to have been updated. In addition, the current audio language on-screen display order number can be initialized when the current audio language on-screen display order number is not smaller than a total number of the audio languages in the data stream.

A total number of audio languages in the data stream, the current audio index, and the current audio language on-screen display order number can be stored to correspond to audio track data of a current PMT before the selection of an audio language for reproduction.

The method for selecting an audio language may further include storing a current version of a current PMT, downloading a new PMT of a current channel, comparing the current version of the PMT with a version of the downloaded new PMT, determining that the current PMT has been updated when the current version of the PMT and the downloaded new version of the PMT are different and reading out audio track information from the downloaded new PMT, storing an audio track index and audio tag from the audio track information and returning to the operation of storing the current version of the current PMT.

In addition, the displaying of the current and new current audio language indices may include storing an audio tag corresponding to the current audio language on-screen display order number from audio track information of a current PMT in an audio tag, storing the audio tag in a tag buffer when the audio tag is not "0", storing, in a buffer, a string referencing the tag buffer and including (a current audio index number+1)/a total number of audio languages in the data stream and displaying the string referencing the tag buffer, and storing, in the buffer, a string referencing "audio" and including (the current audio index number+1)/the total number of audio languages in the data stream when it is determined that the audio tag is "0" and displaying the string referencing "audio."

In order to accomplish the above aspects and/or other features of the present invention, there is provided a medium including computer readable code controlling a computer to perform the aforementioned methods.

BRIEF DESCRIPTION OF THE DRAWINGS

The above and other aspects and/or advantages of the present invention will become more readily appreciated from the following description of the embodiments taken in conjunction with the accompanying drawings in which.

DETAILED DESCRIPTION OF PREFERRED EMBODIMENTS

Figure 1:
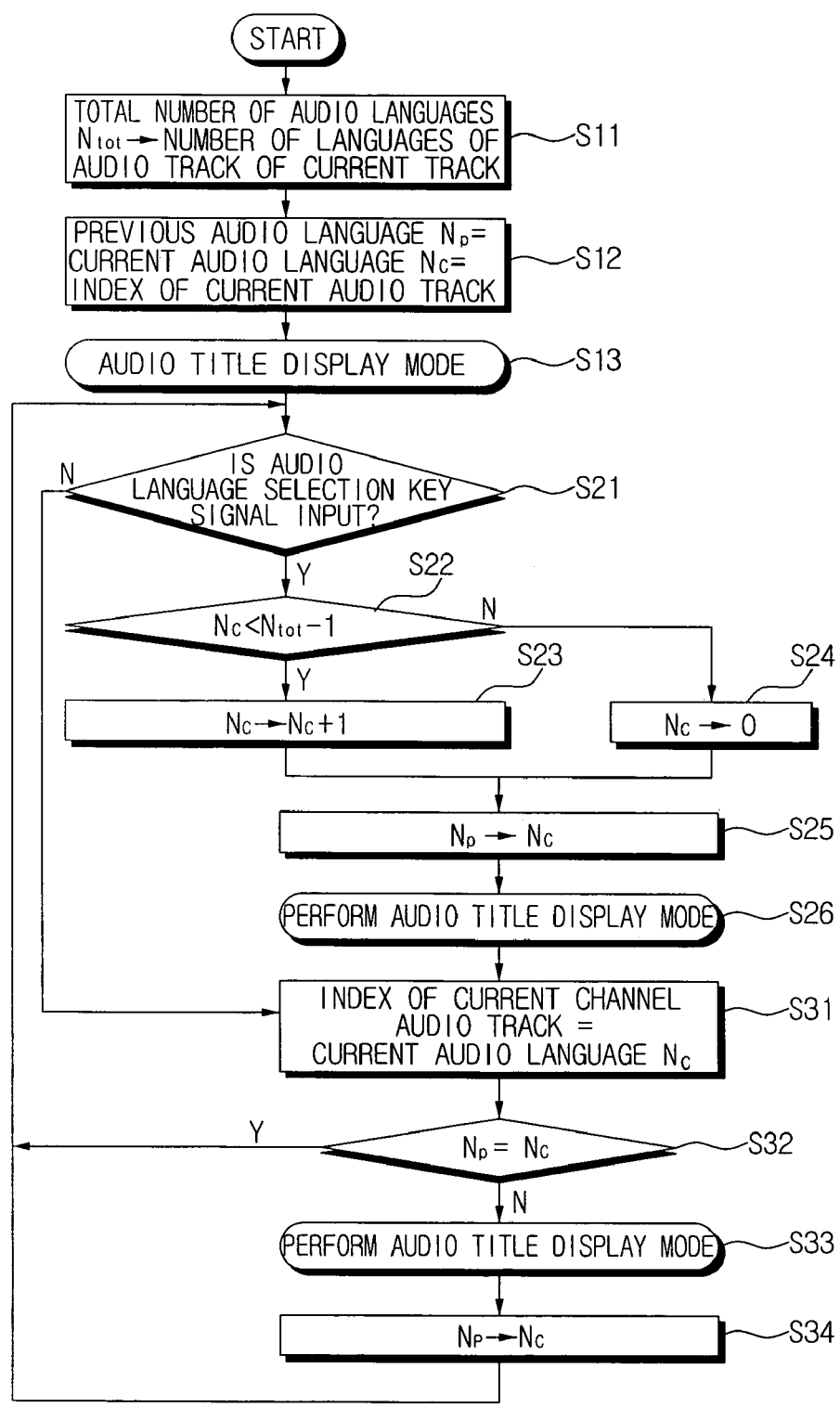
FIG. 1 is a flow chart illustrating an operation of an audio selection menu, according to an embodiment of the present invention.

Reference will now be made in detail to the embodiments of the present invention, examples of which are illustrated in the accompanying drawings, wherein like reference numerals refer to like elements throughout. The embodiments are described below to explain the present invention by referring to the figures.

Figure 2:
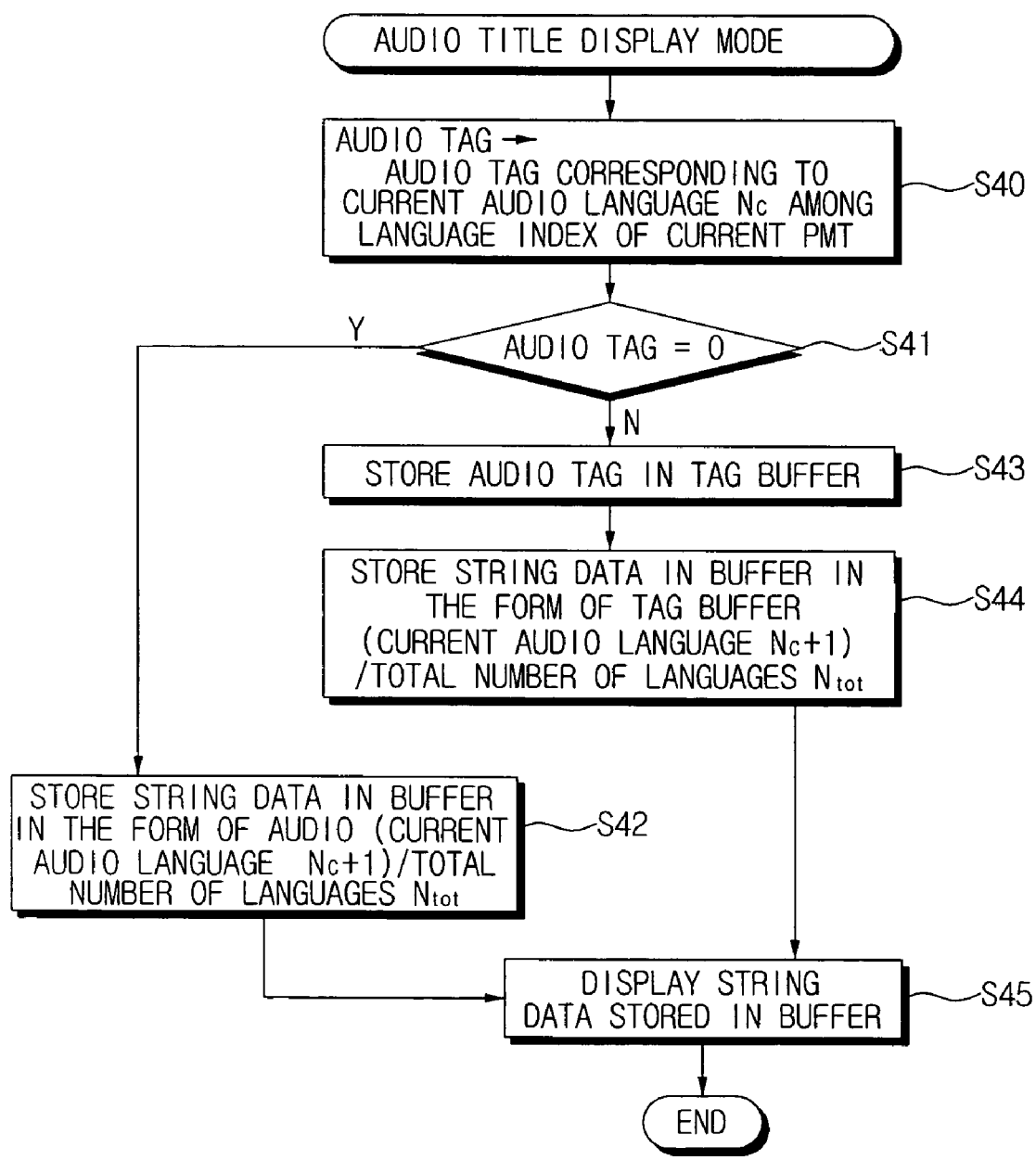
FIG. 2 is a flow chart illustrating a displaying of audio titles in the audio selection menu of FIG. 1, according to an embodiment of the present invention.
Figure 3:
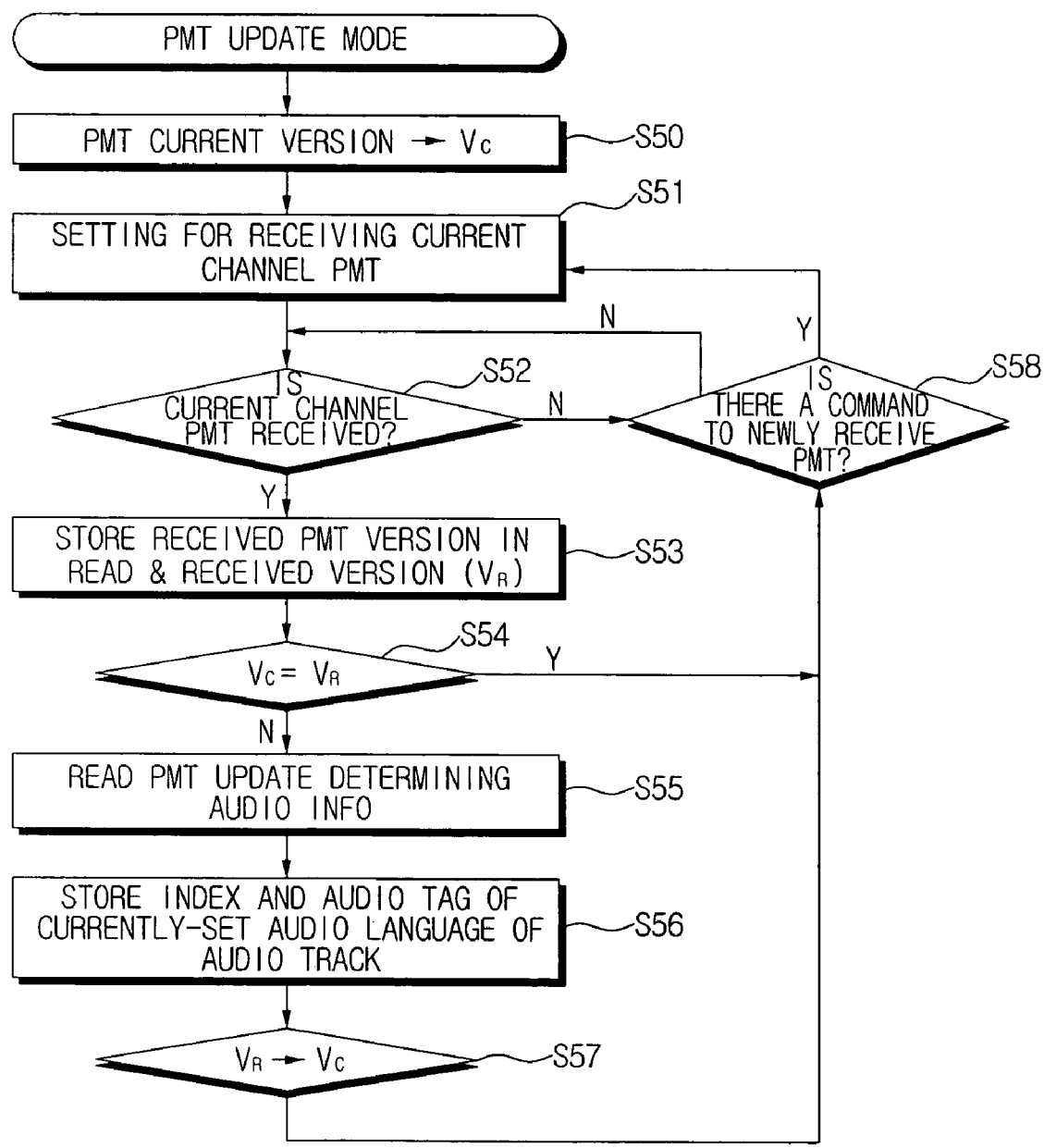
FIG. 3 is a flow chart illustrating an updating of a Program Map Table (PMT) in the audio selection menu of FIG. 1, according to an embodiment of the present invention.

FIG. 1 is a flow chart for a method of selecting an audio language for reproduction by a receiver according to an embodiment of the present invention. Similarly, FIG. 2 is a flow chart for a method of displaying an audio language index in a process embodiment implementing the method of FIG. 1. FIG. 3 is a flow chart for a method of updating a stored Program Map Table (PMT) including the audio language referenced in FIG. 1, according to a further embodiment of the present invention.

When a user presses a predetermined button of a digital broadcasting receiver to select an audio language available with a digital broadcasting program, the display of an audio language selection menu is initiated.

A method for selecting an audio language, according to an embodiment of the present invention, includes the operations of: changing a set audio language, set to be reproduced by a receiver, in response to an audio language selection button being pressed; checking whether audio language information of a data stream changes as a PMT of the data stream is updated; updating the set audio language if there is a change; and displaying available audio indices reflecting the changed information on a screen. The PMT may include information on programs of a channel transmitted with an audio and video signal in a data stream, e.g., in a digital broadcasting signal, and include audio track data including information of available audio languages for particular programs.

As shown in FIG. 1, a total number of audio languages Ntot, and their respective on-screen display order numbers, are stored, corresponding to audio track data of a currently stored PMT, for initializing an audio language selection menu (S11, S12). A previous audio language on-screen display order number Np, and a current audio language on-screen display order number Nc, are set to correspond to audio language indices of an audio track of a current channel. Upon initiating the audio selection menu, the audio language indices and the total number of the audio languages Ntot, etc., can be displayed (S13), e.g., in accordance with an audio title display mode.

As an example, while the audio language indices are displayed, it is determined whether an audio language selection button, generating a language selection key signal, for example, has been pressed (S21). If the current audio language on-screen display order number Nc is greater than or equal to the total number Ntot minus one (S22), then the current audio language on-screen display order number Nc is initialized as "0" (S24). Alternatively, the current audio language on-screen display order number Nc is increased by one (S23). The previously stored audio language on-screen display order number Np is then set to a value of the changed current audio language on-screen display order number Nc (S25) and updated in the current audio index. The audio title display mode is thereafter controlled to display the changed data (S26).

Subsequently, the current audio language on-screen display order number Nc is now set (S31) to correspond with a current audio index, thereby reflecting an update of the PMT. The previous audio language on-screen display order number Np, assigned in step S25, is then compared with the current audio language on-screen display order number Nc, set in step S31, to see if the audio language on-screen display order numbers match (S32). When the on-screen display order numbers are not the same, the audio title display mode displays the changed audio language information (S33) and previous on-screen display order number Np is set to have the value or the current on-screen display order number Nc (S34). When the on-screen display order numbers are the same, as determined in step S32, the method returns to step S21 to repeat the above processes.

As illustrated in FIG. 2, regarding the audio title mode S26 of FIG. 1, an audio tag is stored (S40), with the audio tag corresponding to the current audio language on-screen display order number Nc in the audio language index of the PMT audio track. When it is determined that the stored audio tag information is "0" (S41), a string "Audio (current audio index+1)/total number of audio languages" is stored in a buffer (S42). For example, when the current audio language on-screen display order number is initialized and the total number of the audio languages is 2, the string "Audio ½" is stored in the buffer. When the audio tag is not "0", the audio tag information is stored in a tag buffer (S43), and a string of "tag buffer (current audio index+1)/total number of the audio languages" is stored in the buffer (S44). The tag buffer may be used in various methods for display.

The string stored at the buffer is then displayed on the screen (S45).

FIG. 3 shows the PMT update mode for determining whether the PMT has been updated to reflect the update of the PMT on the audio language selection menu. The PMT includes information on programs of a channel transmitted with audio and video data, of a digital broadcasting stream, and version information for determining whether the version of the PMT has changed in order to determine whether there has been a change of information for corresponding programs. When the PMT version has changed, the changed PMT is thereafter analyzed to update audio language information.

As illustrated in FIG. 3, a current version of the PMT is stored as Vc (S50), a current PMT of a current channel (S51) is then received. It is then determined whether the PMT of the current channel has been received (S52), and then a version of the received PMT is stored as Vr (S53). Thereafter, the Vc and Vr are compared (S54), and if the Vc is different from the Vr then the current PMT is determined to have been updated and audio track information of the PMT is then read (S55). A currently set audio language index and audio tag from the audio track are then stored (S56). The PMT version stored as Vr is then stored as the current version Vc (S57), and then it is determined whether a command for newly receiving a PMT has been received (S58), whereby the method returns to step S51 to receive an updated PMT and to repeat the PMT update mode.

The PMT update mode continues to be performed while the audio language selection menu is operated, thereby enabling the audio language selection menu to be performed by using the audio language indices reflecting the updated PMT.

According to embodiments of the invention, when a PMT, including audio language information, changes after a user starts an audio language selection menu, on-screen display orders and corresponding names of actual audio languages are updated by checking the changed PMT, thereby enabling the prevention of a user from accidentally selecting the wrong audio language or from generating an error due to the difference between the actual audio language information and the initialized information, when selecting an audio language using the audio language selection menu.

The foregoing embodiments and advantages are merely exemplary and are not to be construed as limiting the present invention. The present teaching can be readily applied to other types of apparatuses. Further, the description of the present invention is intended to be illustrative, and not to limit the scope of the claims. Many alternatives, modifications, and variations will be apparent to those skilled in the art. For example, a medium could embody computer readable code to control a computer to perform any of the aforementioned method embodiments, as commonly understood.

Further, while the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for selecting an audio language of a digital broadcasting receiver by detecting and updating a PMT including audio track information, from an input digital broadcasting stream, the method comprising:

determining whether an audio language, of available audio languages of a data stream, has been selected for reproduction by the digital broadcasting receiver;

increasing a current audio language on-screen display order number, in a current on-screen audio language index, by one, when the audio language has been selected;

setting a previous audio language on-screen display order number to equal a value of the increased current audio language on-screen display order number and storing the increased current audio language on-screen display order number in the current audio language index;

displaying the current audio language index having the increased current audio language on-screen display order number;

fetching a new current audio language index, and setting the current audio language on-screen display order number to correspond to the new current audio language index;

comparing the previous audio language on-screen display order number with the current audio language on-screen display order number;

displaying the new current audio language index, setting the previous audio language on-screen display order number to equal the value of the current audio language on-screen display order number, and then returning to the operation of determining of whether an audio language selection has been made when the previous audio language on-screen display order number and current audio language on-screen display order number are different; and returning to the operation of determining of whether an audio language selection has been made when the previous audio language on-screen display order number and current audio language on-screen display order number are the same.

2. The method according to claim 1, wherein the current audio language index is set to correspond to the new current audio language index when the PMT is determined to have been updated.

3. The method according to claim 1, further comprising initializing the current audio language on-screen display order number when the current audio language on-screen display order number is not smaller than a total number of the audio languages in the data stream.

4. The method according to claim 1, further comprising storing a total number of audio languages in the data stream, the current audio index, and the current audio language on-screen display order number corresponding to audio track data of a current PMT before the selection of an audio language for reproduction.

5. The method according to claim 1, further comprising:

storing a current version of a current PMT;

downloading a new PMT of a current channel;

comparing the current PMT with the downloaded new PMT;

determining that the current PMT should be updated when the current PMT and the downloaded new PMT are different and reading out audio track information from the downloaded new PMT; and storing an audio track index and audio tag from the audio track information and returning to the operation of storing the current version of the current PMT.

6. The method according to claim 1, wherein the displaying of the current and new current audio language indices comprises:

storing an audio tag corresponding to the current audio language on-screen display order number from audio track information of a current PMT in an audio tag;

storing the audio tag in a tag buffer when the audio tag is not "0";

storing, in a buffer, a string referencing the tag buffer and including (a current audio index number+1)/a total number of audio languages in the data stream and displaying the string referencing the tag buffer; and storing, in the buffer, a string referencing "audio" and including (the current audio index number+1)/the total number of audio languages in the data stream when it is determined that the audio tag is "0" and displaying the string referencing "audio."

7. A medium comprising computer readable code controlling a computer to perform the method of claim 1.

8. A medium comprising computer readable code controlling a computer to perform the method of claim 2.

9. A medium comprising computer readable code controlling a computer to perform the method of claim 3.

10. A medium comprising computer readable code controlling a computer to perform the method of claim 4.

11. A medium comprising computer readable code controlling a computer to perform the method of claim 5.

12. A medium comprising computer readable code controlling a computer to perform the method of claim 6.

\* \* \* \* \*